May 30, 1933.   L. E. STEPHENSON   1,911,856
PIPE SLEEVE
Filed Oct. 28, 1931
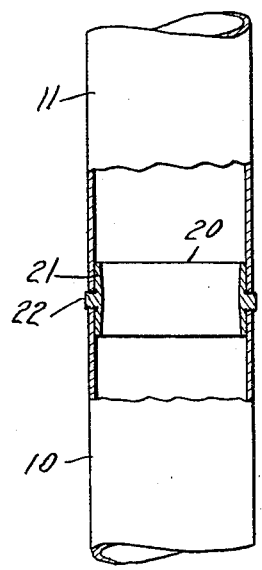
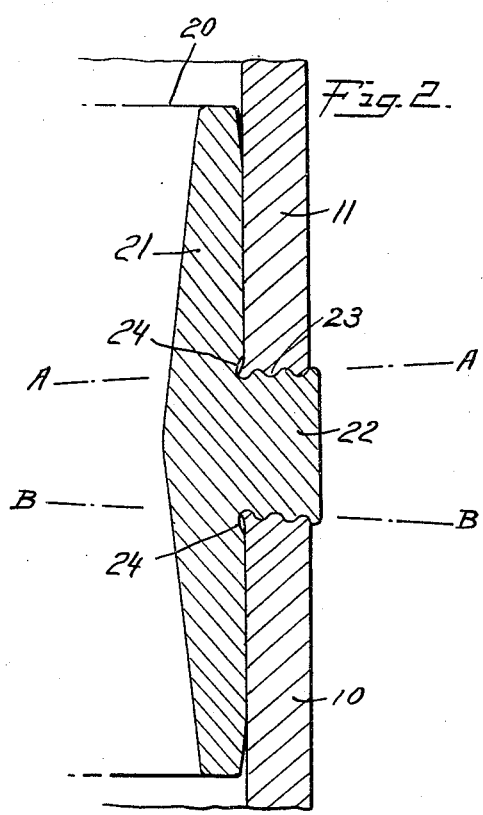
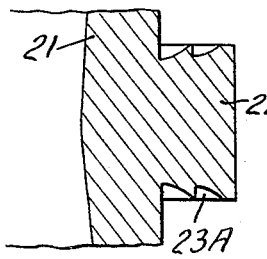
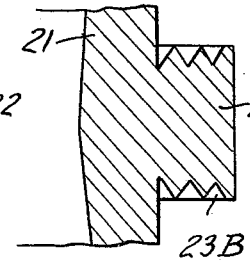
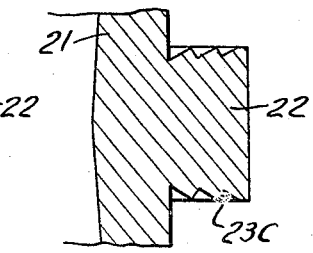
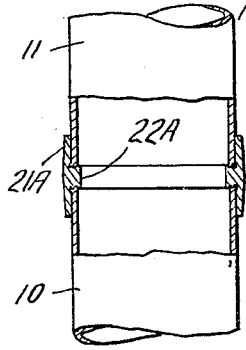
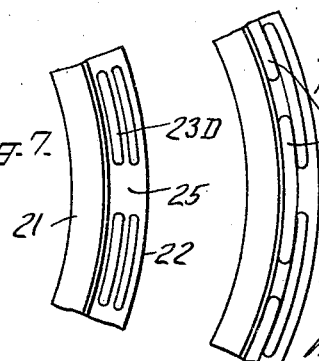
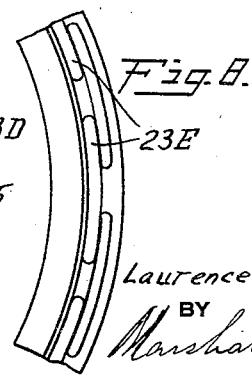
INVENTOR
Laurence E. Stephenson
BY
Marshall & Hawley
ATTORNEYS Patented May 30, 1933

1,911,856

UNITED STATES PATENT OFFICE

LAURENCE E. STEPHENSON, OF NEW YORK, N. Y., ASSIGNOR TO FREDERICK SNARE CORPORATION, OF NEW YORK, N. Y., A CORPORATION OF NEW YORK

PIPE SLEEVE

Application filed October 28, 1931. Serial No. 571,521.

This invention relates to improvements in pipe sleeves, such as are used to interconnect adjacent ends of driven pipes and its object is to provide a simple inexpensive device which will effectively maintain the pipes in alinement and prevent them from telescoping and prevent their ends from becoming abnormally distorted or broken.

Other objects will appear from the following specification in which I will describe the invention, the specific features of which will be pointed out in appended claims.

Referring to the drawing,

Fig. 1 is a sectional elevation of two pieces of pipe with a sleeve which embodies this invention between them;

Fig. 2 is a sectional elevation on an enlarged scale of a portion of a sleeve of preferred construction;

Figs. 3, 4 and 5 are sectional elevations showing modified constructions of the shoulders of the sleeve;

Fig. 6 is a sectional elevation of two pieces of pipe joined by an outside sleeve which also embodies this invention; and Figs. 7 and 8 are partial plan views illustrating other modifications of the invention.

10 and 11 designate two pieces of pipe or tubing such as is usually driven for piling. 20 is a sleeve which comprises a substantially cylindrical portion 21 which fits within the pipes. 22 is an annular flange which projects outwardly from the center of the part 21, a distance slightly greater than the thickness of the pipe. A novel feature of this sleeve is that the surfaces of the flange which form shoulders against which the ends of the pipe abut, are grooved or corrugated, as shown at 23. The result of this construction is that the ends of the pipe, when subjected to driving pressure will not slip outwardly on the flange. In fact, the sleeve is made of harder metal than the pipes so that the ends of the pipe become indented and expressed into the depressions in the flange.

Another novel feature is that these grooved surfaces are disposed on lines A, A and B, B which converge inwardly, as shown in Fig. 2. This inward slope of the shoulders has the effect of giving the ends of the pipes a tendency to move inwardly and thus overcomes the undesirable tendency for them to become expanded over the end of the flange 22.

A still further feature of novelty is that grooves 24 are formed near the juncture of the inner surfaces of the body 21 and the surfaces of the flange which form the pipe abutting shoulders. If the sleeves are cast without these grooves, a fillet would be formed which would have a tendency to bend the ends of the pipes outwardly and as it is the object of this invention to prevent this, the grooves 24 are formed to provide a clearance for the inner edges of the ends of the pipe which gives room for them to bend inwardly, as is desirable.

In Figs. 3, 4 and 5, the flanges 22 are shown with parallel shoulders except for the annular grooves therein and without the feature of the clearance grooves 24. In Fig. 3 the grooves on the shoulder surfaces are in the form of inwardly sloping curved grooves 23A. In Fig. 4 these shoulders are shown at 23B as having equilateral V-grooves therein. In Fig. 5 the grooves 23C have unequal sloping flat surfaces. In each of the constructions shown in Figs. 3, 4 and 5, the deepest part of the innermost groove is adjacent the outer cylindrical surface of the body 21. These figures are included for the purpose of showing that no limitation is intended as to the shape of the shoulder surfaces.

Fig. 6 shows a sleeve with its body portion 21A adapted to surround the pipes 10 and 11 with its flanges 22A extending inwardly therefrom.

It is obvious that the grooves and ridges in the shoulders need not be continuously circular as they may be spaced about the flange 22, as shown at 23D in Fig. 7 with flat surfaces 25 between them, or they may be staggered, as shown at 23E in Fig. 8.

I intend no limitations other than those imposed by the appended claims.

What I claim is:

1. In a pipe joint, comprising a pair of cylindrical pipes, a sleeve interposed between said pipes, said sleeve comprising a body having cylindrical surfaces adapted to telescopingly engage the pipes, and a flange projecting from the body of the sleeve between the ends of the pipes, and means for maintaining the pipe walls relatively in substantial alignment, comprising relatively deep depressions and ridges on the flanges, positioned to bite into the ends of the pipes when they are forced on the sleeve.

2. In a pipe joint, comprising a pair of cylindrical pipes, a sleeve interposed between said pipes, said sleeve comprising a body having cylindrical surfaces fitting the inner surfaces of the pipes, and a flange projecting outwardly from the body of the sleeve between the ends of the pipes, and means for maintaining the pipe walls relatively in substantial alignment, comprising relatively deep depressions and ridges on the flanges, positioned to bite into the ends of the pipes when they are forced on the sleeve.

3. In a pipe joint, comprising a pair of cylindrical pipes, a sleeve interposed between said pipes, said sleeve comprising a body having cylindrical surfaces fitting the outer surfaces of the pipes, and a flange projecting inwardly from the body of the sleeve, between the ends of the pipes, and means for maintaining the pipe walls relatively in substantial alignment, comprising relatively deep depressions and ridges on the flanges, positioned to bite into the ends of the pipes when they are forced on the sleeve.

4. In a pipe joint comprising a pair of cylindrical pipes, a sleeve interposed between said pipes, said sleeve comprising a body having cylindrical surfaces adapted to telescopingly engage the pipes, and a flange projecting from the body of the sleeve between the ends of the pipes, and means for maintaining the pipe walls relatively in substantial alignment, comprising relatively deep depressions and ridges on the flanges, positioned to bite into the ends of the pipes when they are forced together on the sleeve, said sleeve being provided with grooves between each of the flange surfaces and the adjacent cylindrical surfaces, to accommodate flow of the pipe walls as they telescope on the sleeve.

5. A sleeve adapted to be interposed between adjacent sections of pipes, comprising a body having cylindrical surfaces arranged to telescopingly engage the pipes and a flange projecting from the body of the sleeve between said cylindrical surfaces, said flange forming shoulders against which the ends of the pipes may abut, relatively deep depressions and ridges on each shoulder and the adjacent cylindrical surface positioned to bite into the ends of the pipes when they are forced on the sleeve, and effective thereby to maintain the pipe walls relatively in substantial alignment.

LAURENCE E. STEPHENSON.